(12) United States Patent
Gerçek

(10) Patent No.: US 10,899,644 B2
(45) Date of Patent: Jan. 26, 2021

(54) SANITIZING WASTEWATER

(71) Applicant: Saudi Arabian Oil Company, Dhahran (SA)

(72) Inventor: Serhan Gerçek, Abqaiq (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/126,609

(22) Filed: Sep. 10, 2018

(65) Prior Publication Data
US 2020/0079671 A1 Mar. 12, 2020

(51) Int. Cl.
*C02F 3/34* (2006.01)
*C02F 3/02* (2006.01)

(52) U.S. Cl.
CPC ........... *C02F 3/348* (2013.01); *C02F 3/02* (2013.01); *C02F 2301/026* (2013.01); *C02F 2301/08* (2013.01)

(58) Field of Classification Search
CPC .. C02F 3/103; C02F 3/348; C02F 3/02; C02F 2301/08; C02F 2301/026; C02F 2201/002; C02F 3/10; C02F 3/101
USPC ............................................. 210/615, 321.83
See application file for complete search history.

(56) References Cited

U.S. PATENT DOCUMENTS

| | | | |
|---|---|---|---|
| 3,956,128 A | 5/1976 | Turner | |
| 4,676,892 A * | 6/1987 | Grabowski | C02F 3/082 |
| | | | 210/150 |
| 4,897,356 A | 1/1990 | Simpson | |
| 5,997,812 A | 12/1999 | Burnham | |
| 6,749,745 B2 | 6/2004 | Jowett | |
| 7,022,222 B2 | 4/2006 | Jowett | |
| 2002/0134717 A1* | 9/2002 | Jowett | C02F 3/06 |
| | | | 210/150 |
| 2005/0230310 A1 | 10/2005 | Butts | |
| 2011/0068057 A1* | 3/2011 | Haley | C02F 3/006 |
| | | | 210/619 |

(Continued)

FOREIGN PATENT DOCUMENTS

| | | |
|---|---|---|
| CN | 103981081 | 8/2014 |
| CN | 105923940 | 9/2016 |
| WO | 2007129327 | 11/2007 |

(Continued)

OTHER PUBLICATIONS

Chi et al, English Machine Translation WO 2016054939, pp. 1-6 (Year: 2016).*

(Continued)

*Primary Examiner* — Claire A Norris
(74) *Attorney, Agent, or Firm* — Fish & Richardson P.C.

(57) ABSTRACT

Wastewater is received at an inlet of a nested coil of tubing. The nested coil of tubing includes an outer coil of tubing and at least one inner coil of tubing. The nested coil of tubing includes at least one of protrusions or filaments within an interior of the nested coil of tubing. The filaments or protrusions are radially arranged within an interior of the tubing, and microbial growth that is configured to treat the wastewater is disposed on at least portions of the interior. The wastewater is flowed through the nested coil of tubing. The microbial growth treats the wastewater to remove at least portions of sanitary waste in the wastewater. The treated wastewater is flowed through an outlet of the nested coil of tubing.

20 Claims, 3 Drawing Sheets

(56) References Cited

U.S. PATENT DOCUMENTS

2014/0166559 A1* 6/2014 Jowett ..................... C02F 3/101
                                                    210/150

FOREIGN PATENT DOCUMENTS

WO   WO-2016054939 A1 *  4/2016  ................ B01F 5/06
WO   WO-2017139888 A1 *  8/2017  .............. C02F 3/102

OTHER PUBLICATIONS

"Composite Catalog of Oil and Field Equipment and Services," 25th Revision 1982-83 in 5 volumes, vol. 2, World Oil, a Gulf Publishing Company Publication, 1982, 3 pages.
International Search Report and Written Opinion issued in International Application No. PCT/US2019/050152 dated Nov. 4, 2019, 14 pages.

* cited by examiner

SANITIZING WASTEWATER

TECHNICAL FIELD

This disclosure relates to wastewater sanitation with anaerobic digestion.

BACKGROUND

Anaerobic digestion is used in wastewater treatment for treating sewage or industrial wastewaters. Anaerobic digestion includes a variety of microorganisms that process and digest organic matter in the absence of oxygen. Through this process, organic contaminants are removed from wastewater in the form of carbon dioxide, methane and water. Anaerobic digestion process is vastly used in the industry to treat biodegradable waste and sewage sludge. For example, in wastewater treatment facilities for a city or town.

SUMMARY

This disclosure describes technologies relating to sanitizing wastewater.

An example implementation of the subject matter described within this disclosure is a method with the following features. Wastewater is received at an inlet of a nested coil of tubing. The nested coil of tubing includes an outer coil of tubing and at least one inner coil of tubing. The nested coil of tubing includes at least one of protrusions or filaments within an interior of the nested coil of tubing. The filaments or protrusions are radially arranged within an interior of the tubing, and microbial growth that is configured to treat the wastewater is disposed on at least portions of the interior. The wastewater is flowed through the nested coil of tubing. The microbial growth treats the wastewater to remove at least portions of sanitary waste in the wastewater. The treated wastewater is flowed through an outlet of the nested coil of tubing.

Aspects of the example implementation, which can be combined with the example implementation alone or in combination, include the following. The wastewater is flowed in a helical pattern through the nested coil of tubing.

Aspects of the example implementation, which can be combined with the example implementation alone or in combination, include the following. The protrusions or filaments are arranged in the helical pattern along an inner surface of the nested coil of tubing.

Aspects of the example implementation, which can be combined with the example implementation alone or in combination, include the following. The microbial growth is grown along an inner surface and the protrusions or filaments.

Aspects of the example implementation, which can be combined with the example implementation alone or in combination, include the following. Growing the microbial growth includes seeding biomass into the nested coil of tubing.

Aspects of the example implementation, which can be combined with the example implementation alone or in combination, include the following. The wastewater is flowed through the nested coil of tubing having a length determined based on factors including average water consumption per capita per day at an installation location of the nested coil of tubing, time to circulate the wastewater, inner diameter of the nested coil of tubing, and a depth to which each of the protrusions or filaments extends into an inner volume of the nested coil of tubing.

Aspects of the example implementation, which can be combined with the example implementation alone or in combination, include the following. The nested coil of tubing is portable. The method further includes transporting the nested coil of tubing to an installation location.

Aspects of the example implementation, which can be combined with the example implementation alone or in combination, include the following. The tubing is arranged in the nested coil. The outlet to the nested coil is nearer a geometric center of the nested coil than the inlet to the nested coil.

An example implementation of the subject matter described within this disclosure is a wastewater treatment apparatus with the following features. A nested coil of tubing is configured to receive wastewater at an inlet of the tubing. The nested coil of tubing includes an outer coil of tubing and at least one inner coil of tubing. The nested coil of tubing includes at least one of filaments or protrusions within an inner portion of the tubing. The filaments or protrusions are arranged radially within the inner portion of the tubing. The tubing includes an outlet through which to flow treated wastewater. Microbial growth is on the at least one of filaments or protrusions. The microbial growth is configured to treat the wastewater.

Aspects of the example implementation, which can be combined with the example implementation alone or in combination, include the following. A recirculation line fluidically connects the inlet and the outlet. The recirculation line is configured to direct all of the wastewater towards the inlet.

Aspects of the example implementation, which can be combined with the example implementation alone or in combination, include the following. The tubing includes high-density polyethylene.

Aspects of the example implementation, which can be combined with the example implementation alone or in combination, include the following. The protrusions or filaments extend a length of the tubing helically around an interior of the tubing.

Aspects of the example implementation, which can be combined with the example implementation alone or in combination, include the following. A nested coil diameter of the nested coil of tubing is reduced towards the center of the nested coil of tubing. The inlet is at an outer side of the nested coil diameter and the outlet is at an inner side of the nested coil diameter.

Aspects of the example implementation, which can be combined with the example implementation alone or in combination, include the following. The tubing is between 10 feet and 100 feet in length.

Aspects of the example implementation, which can be combined with the example implementation alone or in combination, include the following. A tubing diameter of the tubing is between three and seven inches.

Aspects of the example implementation, which can be combined with the example implementation alone or in combination, include the following. The protrusions or filaments extend up to 200% of an inner diameter of the tubing.

Aspects of the example implementation, which can be combined with the example implementation alone or in combination, include the following. The apparatus is portable.

An example implementation of the subject matter described within this disclosure is a wastewater treatment system with the following features. A wastewater treatment unit includes a nested coil of tubing configured to receive wastewater at an inlet of the tubing. The nested coil of tubing includes an outer coil of tubing and at least one inner coil of tubing. The nested coil of tubing includes at least one of filaments or protrusions within an interior of the tubing. The filaments or protrusions are radially arranged within the interior of the tubing. The tubing includes an outlet through which to flow treated wastewater. Microbial growth is on the at least one of filaments or protrusions. The microbial growth is configured to treat the wastewater. A recirculation line fluidically connects the inlet and the outlet. The recirculation line is configured to direct all of the wastewater towards the inlet. A wastewater collection tank is fluidically coupled to the wastewater treatment unit. The wastewater collection tank is positioned upstream of the wastewater treatment unit. A settling tank is fluidically coupled to the wastewater treatment unit. The wastewater collection tank is positioned downstream of the wastewater treatment unit.

Particular implementations of the subject matter described in this disclosure can be implemented so as to realize one or more of the following advantages. The wastewater treatment apparatus described here is smaller than conventional units and is portable. As a result, the system can easily be installed in remote locations or be used to temporarily increase the capacity of a smaller, pre-existing facility. In some implementations, the coiled tubing can be formed at the application field.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Remote or temporary field sites often lack wastewater treatment facilities. As a result, wastewater is often loaded into trucks and shipped to a separate treatment facility. This process is time consuming, expensive, and creates logistical challenges. Installing a full-sized wastewater treatment system at such locations is not economically feasible.

This disclosure relates to a portable, coiled pipe treatment unit for wastewater treatment. The unit includes a nested, coiled pipe having an inlet near an outside of the nested coil and an outlet at an inside of the nested coil. The wastewater will be flowed through the inlet, through the nested coils, and out the outlet, and circulated within the pipe for the duration of the treatment. The pipe can be made of high-density polyethylene (HDPE). The inner surface of the pipe can include multiple protrusions or filaments on to which microbes are attached. Initial microbial growth inside the pipe can be achieved by seeding biomass into the pipe. Wastewater flowing through the pipe contacts the protrusions or filaments to be treated. Treated effluent flows out of the outlet. In some implementations, the protrusions can form a helical pattern within the inner surface of the pipe in order to promote mixing within the pipe.

Figure 1:
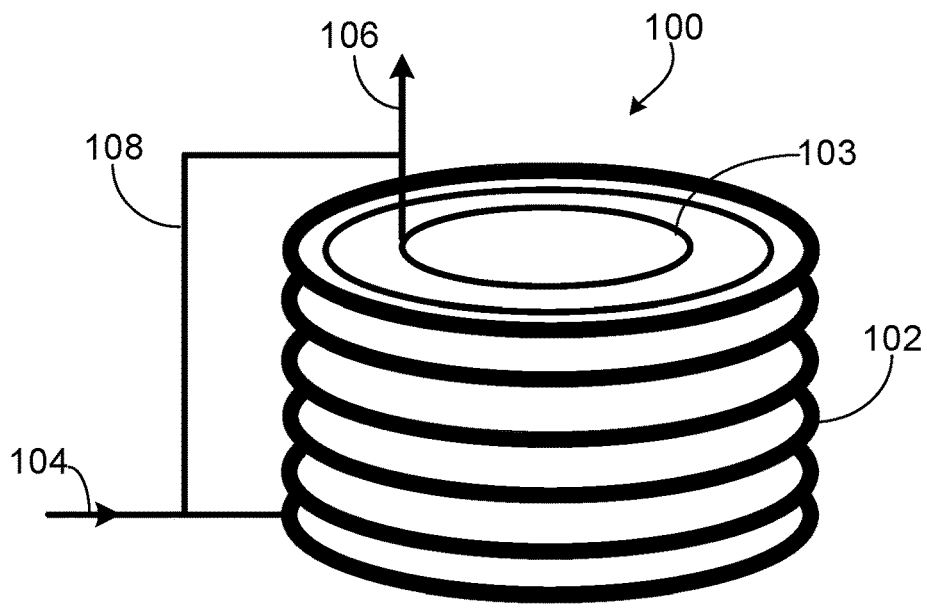
FIG. 1 is a side perspective schematic drawing of an example wastewater treatment unit.

FIG. 1 is a side perspective schematic drawing of an example wastewater treatment unit 100. The wastewater treatment unit 100 includes a nested coil of tubing 102 with a tubing inlet 104, into which wastewater is flowed, and a tubing outlet 106, from which treated wastewater is flowed. The nested coil of tubing 102 is seeded with microbial growth that helps treat the wastewater. Details on the retention of the microbes within the coil of tubing 102 is described later within this disclosure. The microbial growth treats (that is, fully treats or partially treats) the wastewater as it flows through the coil of tubing 102. Anaerobic microorganisms are used for treatment. A recirculation line 108 fluidically connects the inlet 104 and the outlet 106. The recirculation line 108 directs all of the water back towards the inlet during treatment operations. The recirculation rate can be regulated by a control valve, restriction orifice, pump, or any other flow regulation device. The wastewater treatment unit 100 works as a batch reactor. That is, all of the wastewater is circulated through the treatment unit 100 within the coil of tubing 102 with the help of a circulation pump fluidically connected to the recirculation line 108. The coil of tubing 102 is filled with wastewater, then the treatment unit 100 is closed off. After then, through the recirculation pipe 108, all of the wastewater within the treatment unit 100 is circulated for certain time until the desired treatment level is achieved or based on the capacity of the system, such as flowrate of the wastewater and the collection tank capacity. By recirculating the water for the specified duration of time, the contact duration of organic matter inside the wastewater with the biomass is maximized.

To increase a treatment area density, the tubing is arranged as a nested coil. That is, a diameter of the nested coil tubing 102 is reduced towards the center 103 of the nested coil of tubing 102. In some implementations, the inlet 104 is at an outer side of the nested coil diameter and the outlet 106 is at an inner side of the nested coil diameter. The increased treatment density helps the wastewater treatment unit 100 be portable as it reduces the footprint of the unit 100 without reducing the capacity. The treatment unit 100 can include a standalone HDPE nested tubing arrangement where pipes are tied to each other which enables it to be carried and moved easily from one place to another. Alternatively the coiled tubing can be formed at the application field. While the treatment unit 100 has been described as a nested tubing arrangement, other arrangements can be used with similar effects without departing from this disclosure. For example, tubing arranged as a stack of spiraled tubing can be used.

The nested coil of tubing 102 is made of a corrosion resistant material that won't react to the wastewater or the treatment process, for example, high-density polyethylene. The length, diameter, height, and radius of the tubing 102 are all dependent upon the desired footprint and operating capacity. In some implementations, the tubing is between ten feet and one hundred feet in length. In some implementations, a diameter of the tubing is between three and seven inches. For example, for a facility occupied by 10 employees, the length of tubing can be 52 feet based on the assumption of 31.7 gallon/day/capita. For facilities where the population is higher, longer tubing lengths can be used. In some instances, using multiple units can be more practical than extending the length of one unit. In general, s diameter of the tubing, radius and height of the tubing coil are solely depend on the parameters to be considered at the application field, such as average flow rate of the wastewater, the capacity of the collection tank, existing structural obstacles, the desired treatment level, or any combination. Based on these parameters, the dimensions of the coil of tubing 102 are determined. Other design considerations include the minimum radius of the tubing coil. This consideration is dependent on the flexibility of the tubing material and the diameter of tubing at the very end of the inner circle.

Figure 2A:
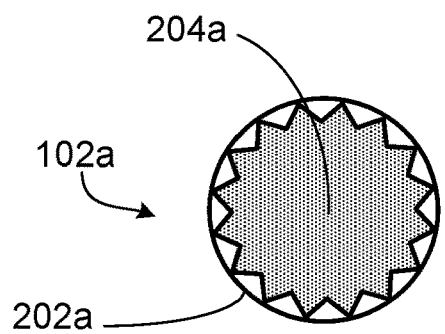
FIGS. 2A-2B are lateral cross-sectional views of an example tubing that can be used with aspects of this disclosure.
Figure 2B:
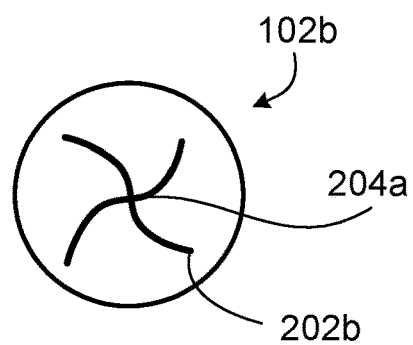

FIGS. 2A-2B are lateral cross-sectional views of an example tubing 102 that can be used with aspects of this disclosure. FIG. 2A is an implementation with treatment elements that are wedge-shaped protrusions 202a that extend towards a center 204a of the tubing 102a. The wedge-shaped protrusions 202a increase an inner surface area of the tubing 102a and provide an attachment point for microbes within the tubing 102a. The increased surface area allows more microbes to contact the wastewater flowing through the tubing 102a and allows the entire wastewater treatment unit 100 (FIG. 1) to have a smaller footprint without decreasing the treatment capacity.

FIG. 2B is an implementation with treatment elements that are filaments 202b that extend from a center 204a of the tubing 102b towards the inner surface of the tubing 102b. The filaments 202b increase an inner surface area of the tubing 102b and provide an attachment point for microbes within the tubing 102b. The increased surface area allows more microbes to contact the wastewater flowing through the tubing 102b and allows the entire wastewater treatment unit 100 (FIG. 1) to have a smaller footprint without decreasing the treatment capacity. While element 202a is the integral part of the tubing, element 202b is inserted separately from outside.

In some implementations, the any of the previously described treatment elements extend up to 200% of an inner diameter of the tubing. In general, the treatment elements increase a treatment surface area without significantly increasing the likelihood of a blockage. While protrusions and filaments have been described in this disclosure, other treatment elements can be used without departing from this disclosure.

Figure 3:
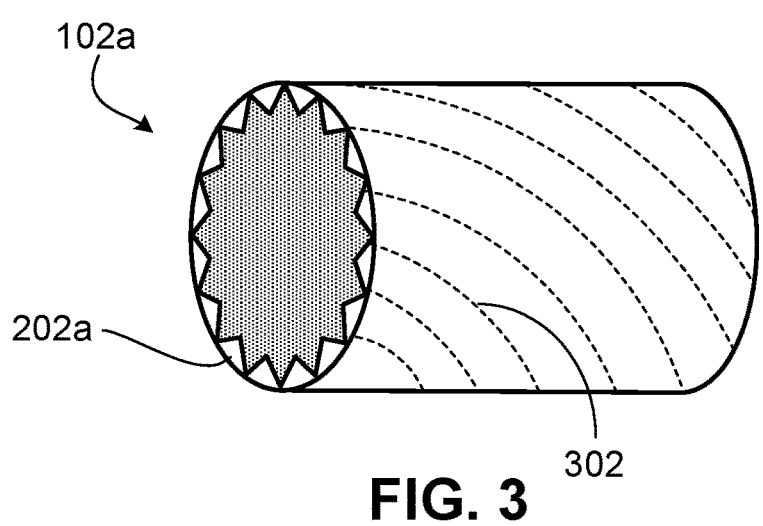
FIG. 3 is a side perspective view of a section of tubing that can be used with aspects of this disclosure.

FIG. 3 is a side perspective view of a section of tubing 102a that can be used with aspects of this disclosure. In some implementations, the treatment elements, such as the wedge-shaped protrusions 202a, extend a length of the tubing in a helical pattern 302 around the inner surface of the tubing. The helical pattern 302 encourages mixing within the tube and encourages greater contact with the treatment surfaces. While the illustrated implementation uses the wedge-shaped protrusions 202a for the helical pattern 302, other treatment elements can be similarly arranged without departing from this disclosure. Alternatively or in addition, other patterns can be used to encourage mixing. For example, the pattern the previously described pattern can be applied partially or in various densities, such as with different sizes of wave lengths.

Figure 4:
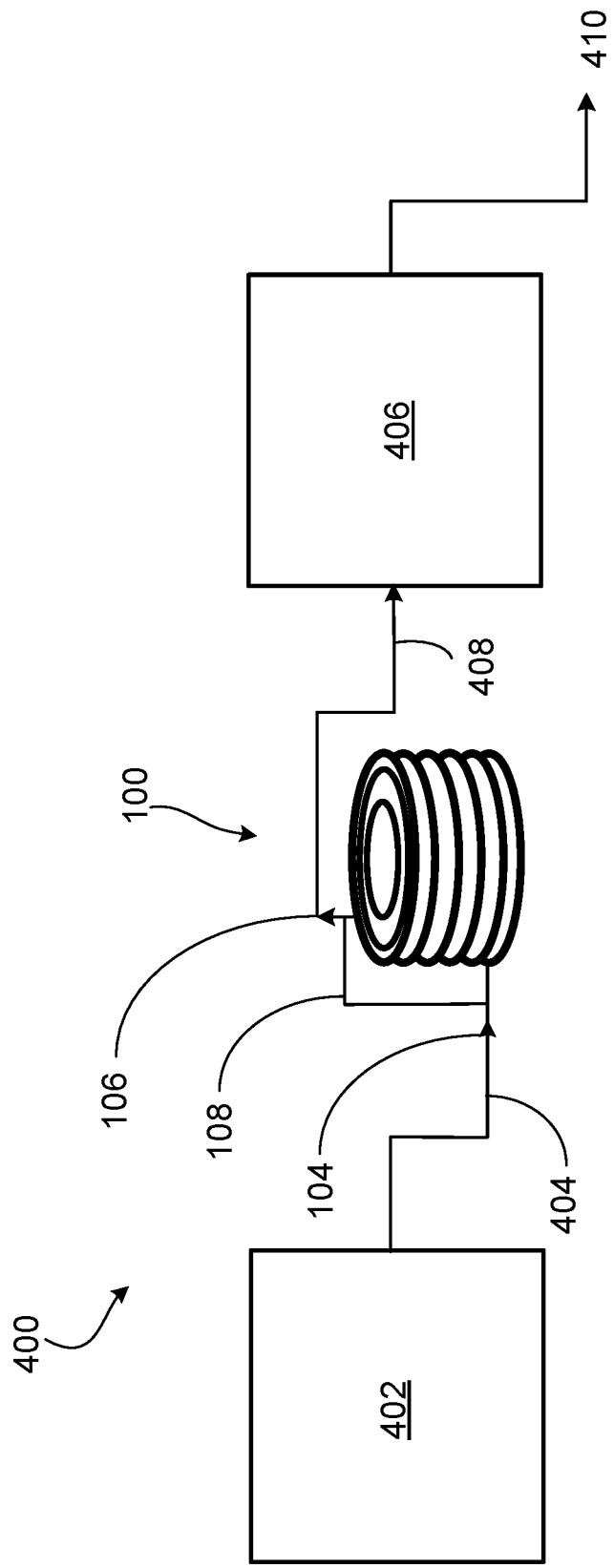
FIG. 4 is a schematic diagram of an example wastewater treatment system.

FIG. 4 is a schematic diagram of an example wastewater treatment system 400. Wastewater is first collected into a collection tank 402. The collection tank 402 is able to hold the wastewater and has sufficient capacity to store and retain wastewater during peaks of wastewater production. The wastewater is then directed to the wastewater treatment unit 100 via a fluid conduit 404. The rate of flow into the wastewater treatment can be regulated by a pump, restriction orifice, gravity, control valve, or any combination of flow control devices. The wastewater then flows into the inlet 104 of the wastewater treatment unit 100, through the wastewater treatment unit 100, and out the outlet 106 of the wastewater treatment unit 100. In some implementations, a portion of clarified wastewater is redirected to the inlet 104 of the wastewater treatment unit 100 via recirculation line 108. The rate of flow through the recirculation line 108 can be regulated by a pump, restriction orifice, gravity, control valve, or any combination of flow control devices. The wastewater treatment unit 100 works as a batch reactor. That is, all of the wastewater is circulated through the treatment unit 100 within the coil of tubing 102 with the help of a circulation pump fluidically connected to the recirculation line 108. The coil of tubing 102 is filled with wastewater, then the treatment unit 100 is closed off. After then, through the recirculation pipe 108, all of the wastewater within the treatment unit 100 is circulated for certain time until the desired treatment level is achieved or based on the capacity of the system, such as flowrate of the wastewater and the collection tank capacity. By recirculating the water for the specified duration of time, the contact duration of organic matter inside the wastewater with the biomass attached to the multiple protrusions or filaments is maximized. The remaining treated water is then directed to a settling tank 406 via a second fluid conduit 408. The settling tank 406 is of sufficient size to allow particulates to settle out of the treated fluid. In other words, the flow velocity significantly reduces within the settling tank 406, allowing suspended particulates, such as flocculated microorganisms, to fall out of the clarified water. In some implementations, additional flow control devices, such as a pump, restriction orifice, gravity, control valve, or any combination of flow control devices, can be included in the second fluid conduit 408. In some implementations, a third fluid conduit (not shown) can be positioned at the bottom of the settling tank to direct the particulates to either the collection tank 402, the inlet 104, or both, to further treat the particulates or re-seed the wastewater treatment unit 100. After the particles have settled out (that is, fully settled out or partially settled out), the clarified fluid is directed to an end user 410. The end user 410 can include further treatment facilities, recycling facilities, or the outside environment. If directed towards the outside environment, the clarified water is tested to ensure that it meets local environmental regulations for cleanliness. While several components have been described, not all components described within this figure need be included in all treatment systems. Alternatively or additionally, other units, such as a chlorinator unit, an ultra violet light unit, active carbon units, or any combination, can be included in certain implementations.

Figure 5:
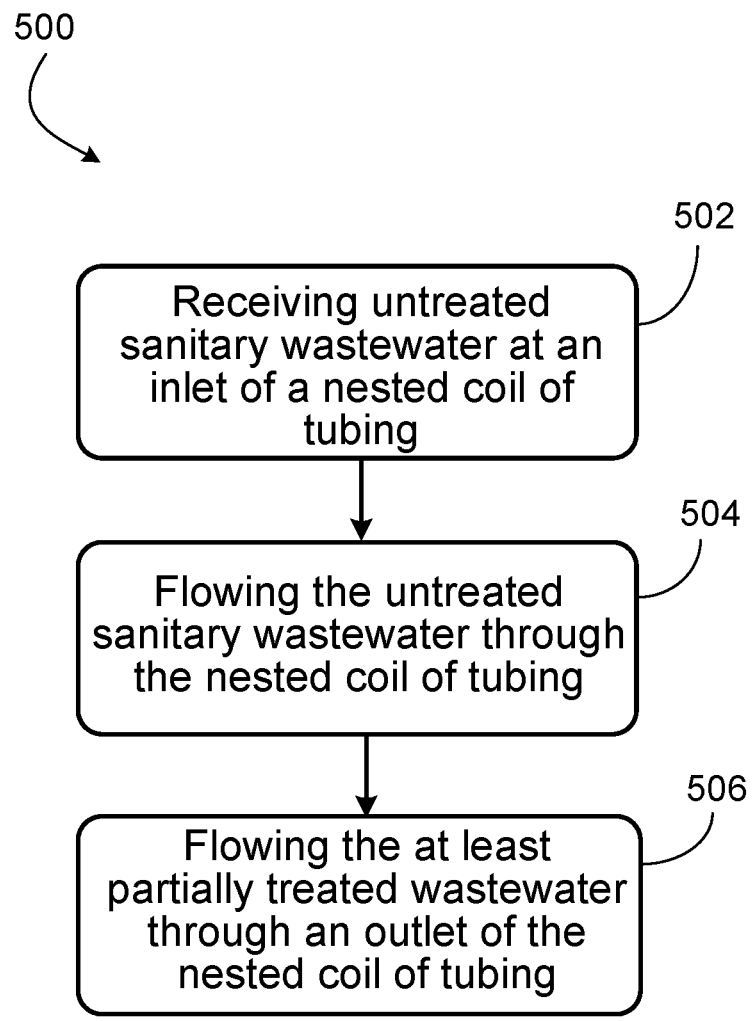
FIG. 5 is a flowchart of an example method that can be used with aspects of this disclosure.

FIG. 5 is a flowchart of an example method 500 that can be used with aspects of this disclosure. At 502, wastewater is received at an inlet of a nested coil of tubing. An outlet to the nested coil is nearer a geometric center of the nested coil than the inlet to the nested coil. The nested coiled tubing includes treatment elements along an inner surface of the nested coil of tubing. In some implementations, the treatment elements are arranged in the helical pattern along the inner surface of the nested coil of tubing. Microbial growth is disposed on at least portions of the inner surface and the treatment elements. In some implementations, the microbial growth grows along the inner surface and the treatment elements. Growing the microbial growth can include seeding biomass into the nested coil of tubing at the installation site. The microbial growth treats the wastewater. At 504, the wastewater is flowed through the nested coil of tubing. The microbial growth at least partially treats the wastewater to remove at least portions of sanitary waste in the wastewater.

In some implementations, the wastewater is flowed in a helical pattern through the nested coil of tubing. At 506, the at least partially treated wastewater is flowed through an outlet of the nested coil of tubing.

The wastewater is flowed through the nested coil of tubing having a length determined based on factors including average water consumption per-capita per day at an installation location of the nested coil of tubing, time needed to circulate the wastewater, inner diameter of the nested coil of tubing, a depth to which each treatment element extends into an inner volume of the nested coil of tubing, or any combination. In some implementations, the nested coil of tubing is portable. In such an implementation, the nested coil of tubing is transported to an installation location and installed prior to use.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may have been previously described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    installing a wastewater treatment unit at a field site, the wastewater treatment unit comprising a nested coil of tubing with an inlet and an outlet, a recirculation line extending from the outlet to the inlet, and a circulation pump operable to circulate wastewater into the inlet, through the nested coil of tubing, out the outlet, and through the recirculation line to the inlet;
    receiving wastewater at the inlet of a nested coil of tubing, wherein the nested coil of tubing comprises an outer coil of tubing and at least one inner coil of tubing fluidically coupled to the outer coil of tubing, the inner coil of tubing comprising a first radius defined from a central longitudinal axis of the nested coil of tubing to a center of the inner coil of tubing and the outer coil of tubing comprising a second radius defined from the central longitudinal axis to a center of the outer coil of tubing, the first radius smaller than the second radius, the outer coil of tubing and the inner coil of tubing together defining a continuous fluid conduit extending from and fluidically connecting the inlet to an outlet of the nested coil of tubing, the nested coil of tubing comprising a plurality of protrusions or a plurality of filaments or both within an interior of the nested coil of tubing, the filaments or protrusions radially arranged within an interior of the tubing and microbial growth configured to treat the wastewater is disposed on at least portions of the interior, wherein the plurality of protrusions extend integrally from an inner surface of the nested coil of tubing radially toward a center of the nested coil of tubing, and wherein the plurality of filaments extend radially from a center of the nested coil of tubing toward an inner surface of the nested coil of tubing;
    filling the nested coil of tubing, the recirculation line, and the circulation pump with wastewater;
    closing off the treatment unit;
    circulating the wastewater through the nested coil of tubing and the recirculation line for a specified duration of time, wherein the microbial growth treats the wastewater to remove at least portions of sanitary waste in the wastewater;
    opening the treatment unit; and
    flowing the treated wastewater through the outlet of the nested coil of tubing.

2. The method of claim 1, wherein the wastewater is flowed in a helical pattern through the nested coil of tubing.

3. The method of claim 2, wherein the plurality of protrusions or filaments are arranged in the helical pattern along an inner surface of the nested coil of tubing.

4. The method of claim 1, further comprising growing the microbial growth along an inner surface and the plurality of protrusions or filaments.

5. The method of claim 4, wherein growing the microbial growth comprises seeding biomass into the nested coil of tubing.

6. The method of claim 1, wherein the wastewater is flowed through the nested coil of tubing having a length determined based on at least one of 1) average water consumption per capita per day at an installation location of the nested coil of tubing, 2) time to circulate the wastewater, 3) inner diameter of the nested coil of tubing, and 4) a depth to which each of the protrusions or filaments extends into an inner volume of the nested coil of tubing.

7. The method of claim 1, wherein the nested coil of tubing is portable, and wherein the method further comprises transporting the nested coil of tubing to an installation location.

8. The method of claim 1, wherein the tubing is arranged in the nested coil, wherein the outlet to the nested coil is nearer a geometric center of the nested coil than the inlet to the nested coil.

9. A wastewater treatment apparatus comprising:
    a batch reactor, the batch reactor comprising:
        a nested coil of tubing configured to receive wastewater at an inlet of the tubing, wherein the nested coil of tubing comprises an outer coil of tubing and at least one inner coil of tubing fluidically coupled to the outer coil of tubing, the inner coil of tubing comprising a first radius defined from a central longitudinal axis of the nested coil of tubing to a center of the inner coil of tubing and the outer coil of tubing comprising a second radius defined from the central longitudinal axis to a center of the outer coil of tubing, the first radius smaller than the second radius, the outer coil of tubing and the inner coil of tubing together defining a continuous fluid conduit extending from and fluidically connecting the inlet of the tubing to an outlet of the tubing, the nested coil of tubing comprising a plurality of filaments or a plurality of protrusions or both within an inner portion of the tubing, the filaments or protrusions arranged radially within the inner portion of the tubing, wherein the plurality of protrusions extend integrally from an inner surface of the nested coil of tubing radially toward a center of the nested coil of tubing, and wherein the plurality of filaments extend radially from a center of the nested coil of tubing toward an inner surface of the nested coil of tubing, the tubing configured to flow treated water away from the tubing through the outlet of the tubing;

a recirculation line extending from the outlet to the inlet;

a circulation pump operable to circulate wastewater into the inlet, through the nested coil of tubing, out the outlet, and through the recirculation line to the inlet; and microbial growth on the plurality of at least one of filaments or protrusions, the microbial growth configured to treat the wastewater.

10. The wastewater treatment apparatus of claim 9, further comprising:
a recirculation line fluidically connecting the inlet and the outlet, the recirculation line configured to direct all of the wastewater towards the inlet.

11. The wastewater treatment apparatus of claim 9, wherein the tubing comprises high-density polyethylene.

12. The wastewater treatment apparatus of claim 9, wherein the protrusions or filaments extend a length of the tubing helically around an interior of the tubing.

13. The wastewater treatment apparatus of claim 9, wherein an outer diameter of the nested coil of tubing is reduced towards a central axis of the nested coil of tubing along a length of the nested coil of tubing parallel to the central axis, wherein the inlet is at an outer side of the nested coil diameter and the outlet is at an inner side of the nested coil diameter.

14. The wastewater treatment apparatus of claim 9, wherein the tubing is between 10 feet and 100 feet in length.

15. The wastewater treatment apparatus of claim 9, wherein a tubing diameter of the tubing is between three and seven inches.

16. The wastewater treatment apparatus of claim 9, wherein the protrusions comprise a plurality of longitudinally continuous, wedge-shaped protrusions, the wedge-shaped protrusions forming continuous fluid channels between adjacent protrusions.

17. The wastewater treatment apparatus of claim 9, wherein the apparatus is portable.

18. A wastewater treatment system comprising:
A wastewater treatment unit comprising:
a batch reactor, the batch reactor comprising:
a nested coil of continuous tubing configured to receive wastewater at an inlet of the tubing, wherein the nested coil of tubing comprises an outer coil of tubing and at least one inner coil of tubing fluidically coupled to the outer coil of tubing, the inner coil of tubing comprising a first radius defined from a central longitudinal axis of the nested coil of tubing to a center of the inner coil of tubing and the outer coil of tubing comprising a second radius defined from the central longitudinal axis to a center of the outer coil of tubing, the first radius smaller than the second radius, the outer coil of tubing and the inner coil of tubing together defining a continuous fluid conduit extending from and fluidically connecting the inlet to an outlet of the nested coil of tubing, the nested coil of tubing comprising a plurality of filaments or a plurality of protrusions or both within an interior of the tubing, the filaments or protrusions radially arranged within the interior of the tubing, wherein the plurality of protrusions extend integrally from an inner surface of the nested coil of tubing radially toward a center of the nested coil of tubing, and wherein the plurality of filaments extend radially from a center of the nested coil of tubing toward an inner surface of the nested coil of tubing, the tubing comprising an outlet through which to flow treated wastewater; and a recirculation line extending from the outlet to the inlet, the recirculation line configured to direct all of the wastewater towards the inlet;

a circulation pump operable to circulate wastewater into the inlet, through the nested coil of tubing, out the outlet, and through the recirculation line to the inlet;

a wastewater collection tank fluidically coupled to the batch reactor; the wastewater collection tank positioned upstream of the wastewater treatment unit;

a settling tank fluidically coupled to the batch reactor, the setting tank positioned downstream of the wastewater treatment unit; and microbial growth on the plurality of at least one of filaments or protrusions, the microbial growth configured to treat the wastewater.

19. The wastewater treatment apparatus of claim 9, wherein the nested coil of tubing comprises a plurality of wedge-shaped protrusions extending integrally from an inner surface of the nested coil of tubing toward a center of the nested coil of tubing.

20. The wastewater treatment apparatus of claim 9, wherein the nested coil of tubing comprises a plurality of filaments extending from a center of the nested coil of tubing toward an inner surface of the nested coil of tubing.

* * * * *